(12) United States Patent
Wang

(10) Patent No.: US 7,143,759 B1
(45) Date of Patent: Dec. 5, 2006

(54) SLOTTER PROVIDED WITH SIMULTANEOUSLY TWO-WAY ROTARY SAW BLADES

(76) Inventor: Fu-Chun Wang, No. 59, North Daxue Road, Yangzhou City, Jiangsu Province (CN)

( * ) Notice: Subject to any disclaimer, the term of this patent is extended or adjusted under 35 U.S.C. 154(b) by 0 days.

(21) Appl. No.: 11/439,495

(22) Filed: May 22, 2006

(51) Int. Cl.
*B28D 1/04* (2006.01)
(52) U.S. Cl. ..................... 125/13.01; 125/12
(58) Field of Classification Search ............. 125/13.01, 125/13.02, 12; 30/347; 83/425.2–425; 408/36–46; 451/358
See application file for complete search history.

(56) References Cited

U.S. PATENT DOCUMENTS

| | | | | |
|---|---|---|---|---|
| 3,986,259 A | * | 10/1976 | McReynolds et al. | 30/121 |
| 4,236,356 A | * | 12/1980 | Ward | 451/352 |
| 4,691,749 A | * | 9/1987 | Reuter | 144/39 |
| 5,020,280 A | * | 6/1991 | O'Reilly | 451/342 |
| 6,874,400 B1 | * | 4/2005 | Johansson | 83/877 |

* cited by examiner

*Primary Examiner*—Dung Van Nguyen
(74) *Attorney, Agent, or Firm*—Pro-Techtor Int'l Services

(57) ABSTRACT

A slotter provided with simultaneously two-way rotary saw blades comprises: an input shaft connected to a gear box by a power source, wherein a driving gear is disposed at the end of the input shaft of the gear box, a first driven gear engages with said driving gear and connects with a first driving shaft of which one end extends out of the gear box and retains a first saw blade. Furthermore, a second driven gear engages with the driving gear and connects with a transmitting gear at a second driving shaft, wherein said transmitting gear further engages with a third driven gear which mounted at the outer portion of first driving shaft by using a bearing, a second saw blade is disposed at a bearing seat of third driven gear such that the first saw blade and the second saw blade can simultaneously rotate in the deferent directions, thereby the reaction forces of the first saw blade and the second saw blade can be offset by each other so as to have a stable operation while in use.

6 Claims, 5 Drawing Sheets

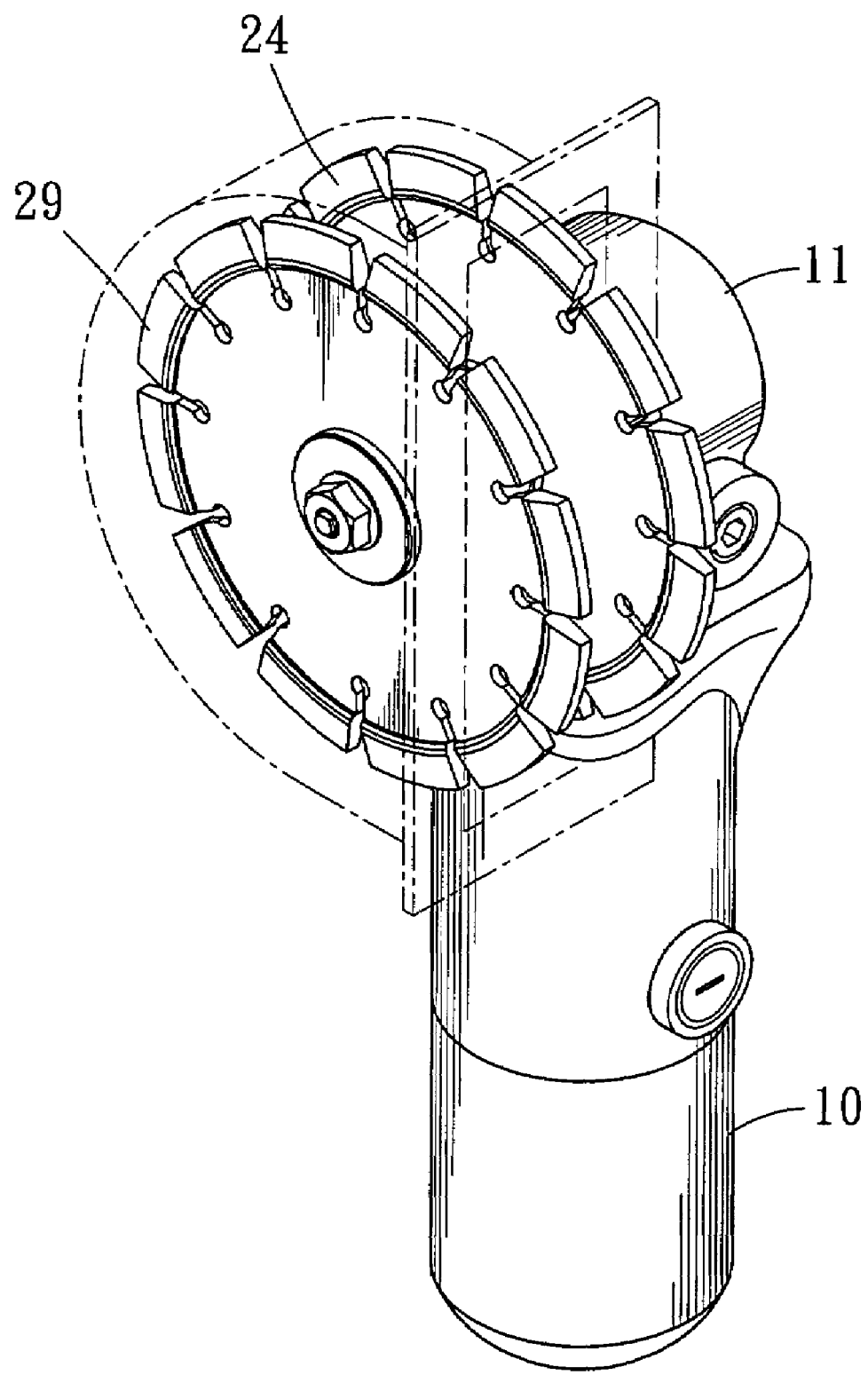
F I G . 3

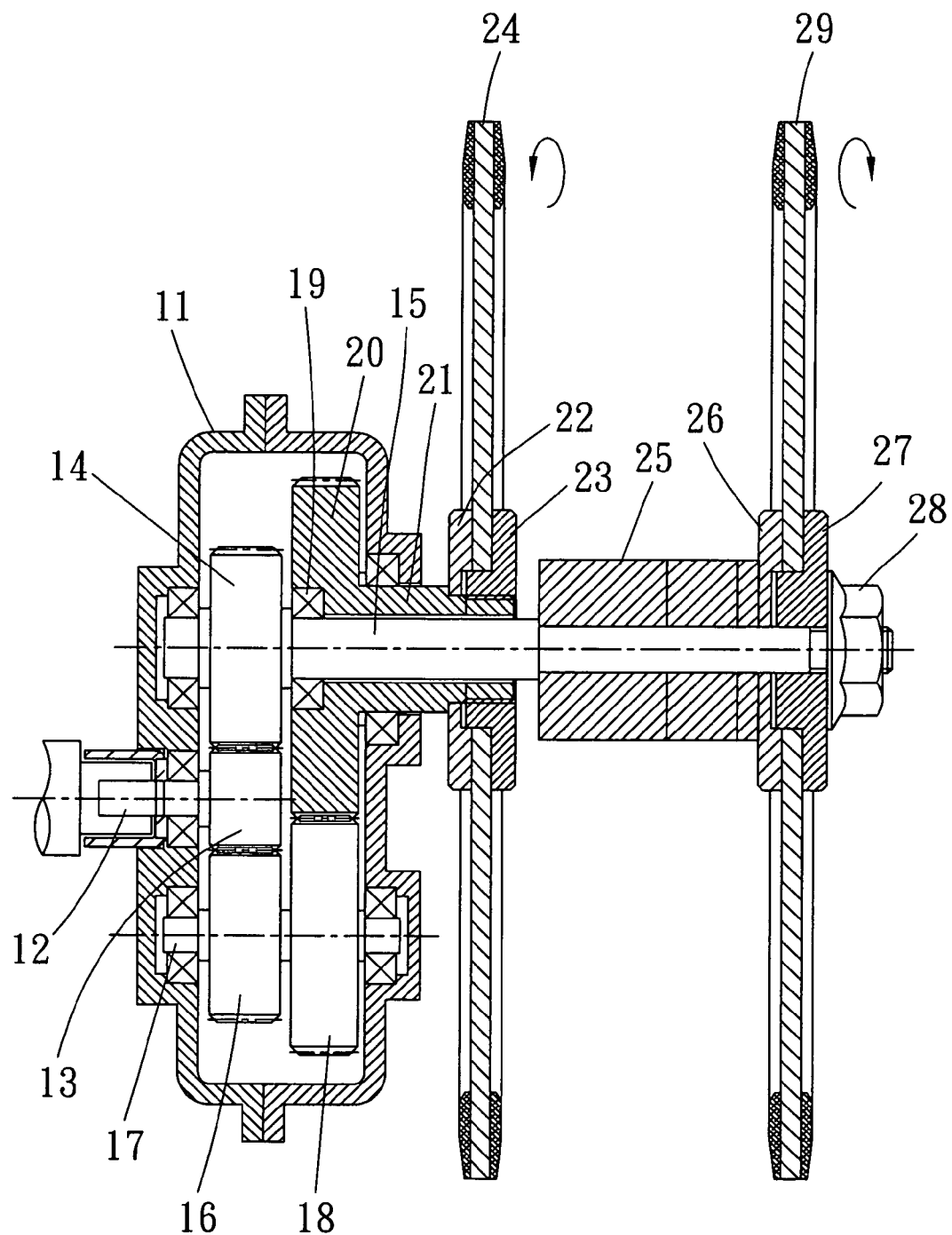
F I G . 4 under a road construction. For example, when
SLOTTER PROVIDED WITH SIMULTANEOUSLY TWO-WAY ROTARY SAW BLADES

BACKGROUND OF THE INVENTION

1. Field of the Invention

The present invention relates to a slotter provided with simultaneously two-way rotary saw blades that can greatly enhance the reaction forces so as to have a stable operation while in use.

2. Description of the Prior Arts

Conventionally, slotters are used on cable distributions of road or house construction. For example, when under a road construction, by using a slotter, two elongated slots will be cut first, and then the material objects between said two elongated slots can be dug out by using percussion tools.

As shown in FIG. 1, a conventional slotter provided with diamond saw blades comprises an input shaft 1 connected to a gear box 2 by a power source, wherein a driving gear 3 is disposed at the end of input shaft 1, a driven gear 4 engages with the driving gear 3 and connects with a driving shaft 5 of which one end extends out of the gear box 2 and locks a first saw blade 6 as well as a second saw blade 7 parallel to each other. However, in the slot-cutting process, the first saw blade 6 and the second saw blade 7 will simultaneously rotate in the same direction, accordingly, the reaction forces will form among the cut workpiece and the two saw blades, thus an unstable operation will occur.

The present invention has arisen to mitigate and/or obviate the afore-described disadvantages.

SUMMARY OF THE INVENTION

The primary objective of the present invention is to provide a slotter provided with simultaneously two-way rotary saw blades that can use a power source to actuate the operation of gear set so as to simultaneously drive a first saw blade and a second saw blade to rotate in different directions such that the reaction forces of the first and the second saw blades can be offset by each other, thus having a stable operation while in use.

The secondary objective of the present invention is to provide a slotter provided with simultaneously two-way rotary saw blades that comprises a first saw blade disposed at the end of a driving shaft, at lease one adjusting pad fitted between the first saw blade and a second saw blade so as to adjust the distance between the first saw blade and the second saw blade, thereby the different widths of slot can be obtained while in the slot-cutting process.

The present invention will become more obvious from the following description when taken in connection with the accompanying drawings, which show, for purpose of illustrations only, a preferred embodiment in accordance with the present invention.

BRIEF DESCRIPTION OF THE DRAWINGS

FIG. 3 is a perspective view of the slotter provided with simultaneously two-way rotary saw blades in accordance with the present invention;

FIG. 4 is a cross sectional view of a part of the slotter provided with simultaneously two-way rotary saw blades in accordance with the present invention;

DETAILED DESCRIPTION OF THE PREFERRED EMBODIMENTS

Figure 1:
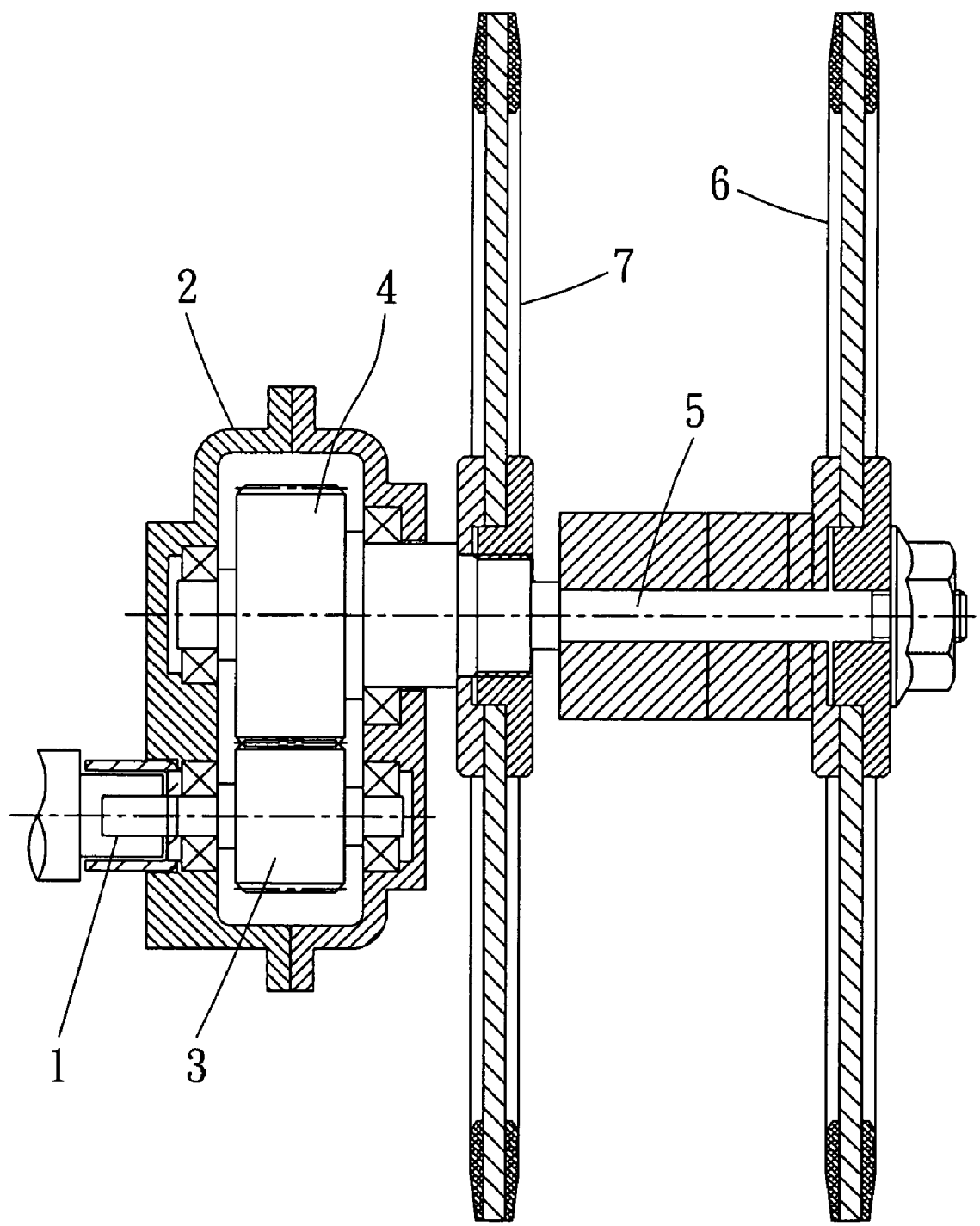
FIG. 1 is a perspective view of a conventional slotter.
Figure 2:
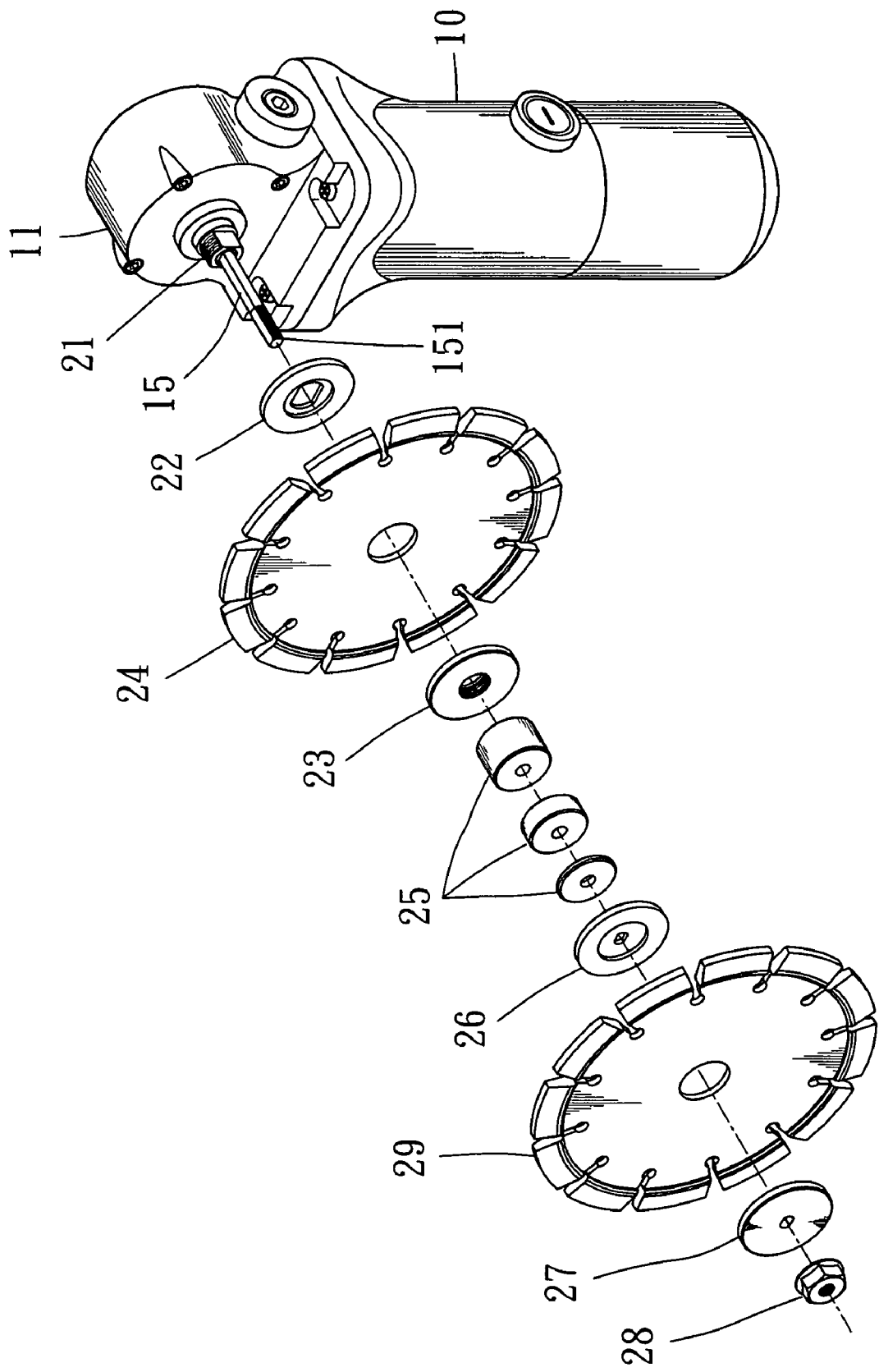
FIG. 2 is an exploded view of a part of a slotter provided with simultaneously two-way rotary saw blades in accordance with the present invention.

Referring to FIGS. 2–4, a slotter provided with simultaneously two-way rotary saw blades in accordance with the present invention comprises a power source (not shown), such as an electric motor or a pneumatic motor, disposed in a grip portion 10 for driving an input shaft 12 to rotate, wherein the input shaft 12 extends to a gear box 11, at the end of input shaft 12 is defined with a driving gear 13; a first driven gear 14 which engages with the driving gear 13 disposed at a first driving shaft 15, wherein by using the first driven gear 14, the driving gear 13 can drive the first driving shaft 15 to rotate in the opposite direction to the rotating direction thereof. In addition, a second driven gear 16 which engages with the driving gear 13 is mounted at a second driving shaft 17, and at one end of the second driving shaft 17 is arranged a transmitting gear 18. By using a bearing 19, a third driven gear 20 can be fitted to the outer portion of first driving shaft 15 so as to engage with the driving gear 18, wherein the third driven gear 20 is integrally formed with a bearing seat 21, through the transmissions of the second driven gear 16, the driving gear 18 and the third driven gear 20, the bearing seat 21 can rotate along the first driving shaft 15, accordingly, the rotating directions of the bearing seat 21 and the driving gear 13 are the same, while the first driving shaft 15 rotates in the opposite direction to the rotating direction of the bearing seat 21. Further, by using a threaded sleeve 22 as well as a nut 23, the bearing seat 21 can retain a second saw blade 24 so as to drive said second saw blade 24 to rotate in the same rotating direction as that of the driving gear 13. Moreover, the first driving shaft 15 projects out of the gear box 11 and at the diametrical segment thereof is formed a stepped plane 151, after fitting at least one adjusting pad 25, a first saw blade 29 can be retained at the first driving shaft 15 by using annular sleeves 26 and 27 as well as a nut 28 such that the first driving shaft 15 can drive the first saw blade 29 to rotate in the opposite direction to that of the driving gear 13, and the first saw blade 29 and the second saw blade 24 will therefore rotate in the opposite direction to each other, such that the reaction forces of the first saw blade 29 and the second saw blade 24 can be offset by each other, thus having a stable operation while in use.

Figure 5:
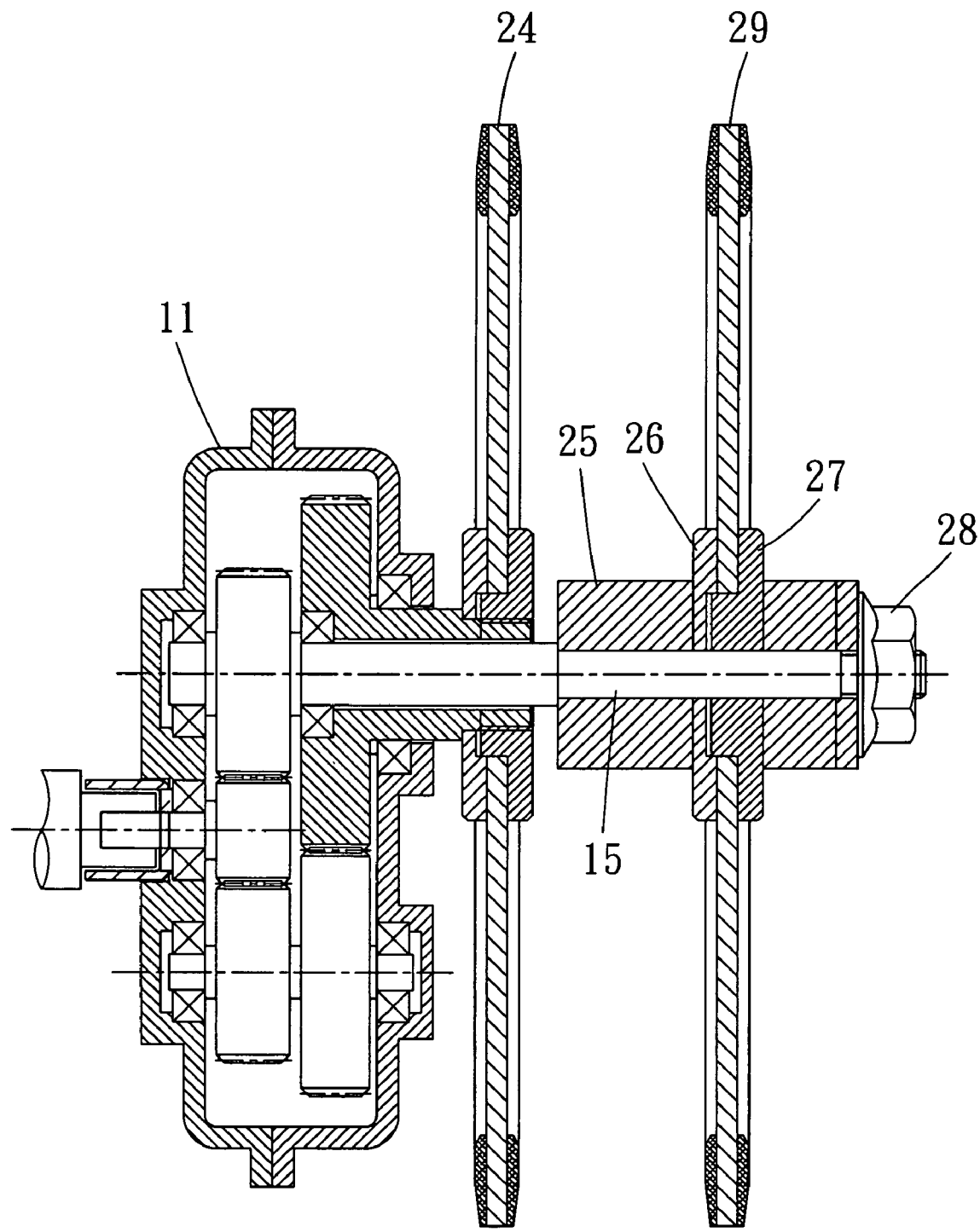
FIG. 5 shows the adjusting operation for slot width.

Referring further to FIG. 5, if the user is desired to adjust the distance between two slots based on usage conditions, the nut 28 can be unfastened so as to disengage the annular sleeves 26 and 27 from the first driving shaft 15, and then the adjusting pads 25 can be increasingly or decreasingly fastened to or unfastened from said driving shaft 15, thereby the required width between the first saw blade 29 and the second saw blade 24 can be obtained.

While we have shown and described various embodiments in accordance with the present invention, it should be clear to those skilled in the art that further embodiments may be made without departing from the scope of the present invention.

What is claimed is:

1. A slotter provided with simultaneously two-way rotary saw blades comprising:

a power source (not shown) disposed in a grip portion for driving an input shaft to rotate, wherein the input shaft extends to a gear box, at the end of input shaft is defined with a driving gear;

a first driven gear engaging with the driving gear and connecting with a first driving shaft of which one end extending out of the gear box and retaining a first saw blade;

a second driven gear engaging with the driving gear and connecting with a transmitting gear at a second driving shaft, wherein the transmitting gear further engages with a third driven gear which mounted at the outer portion of first driving shaft by using a bearing; and a second saw blade disposed at a bearing seat of third driven gear such that the first saw blade and the second saw blade can simultaneously rotate in the deferent directions.

2. The slotter provided with simultaneously two-way rotary saw blades as claimed in claim 1, wherein at least one adjusting pad is fitted to the end portion of first driving shaft and then the first saw blade will be retained thereon.

3. The slotter provided with simultaneously two-way rotary saw blades as claimed in claim 2, wherein the adjusting pads can be increasingly or decreasingly fastened to or unfastened from aforesaid driving shaft, thereby the required width between the first saw blade and the second saw blade can be obtained.

4. The slotter provided with simultaneously two-way rotary saw blades as claimed in claim 1, wherein at the diametrical segment of first driving shaft is formed a stepped plane, by using two annular sleeves as well as a nut, a first saw blade can be located at the first driving shaft.

5. The slotter provided with simultaneously two-way rotary saw blades as claimed in claim 1, wherein a third driven gear is integrally formed with a bearing seat.

6. The slotter provided with simultaneously two-way rotary saw blades as claimed in claim 1, wherein by using a threaded sleeve as well as a nut, the second saw blade can be retained at the bearing seat.

* * * * *